(12) United States Patent
Hou et al.

(10) Patent No.: US 10,865,052 B2
(45) Date of Patent: Dec. 15, 2020

(54) MONITORING SYSTEM FOR CONVEYOR BELT

(71) Applicant: THE YOKOHAMA RUBBER CO., LTD., Tokyo (JP)

(72) Inventors: Gang Hou, Hiratsuka (JP); Masahiko Miyamoto, Hiratsuka (JP); Taro Takahashi, Hiratsuka (JP); Kazuya Kanno, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 16/642,556

(22) PCT Filed: Jun. 26, 2018

(86) PCT No.: PCT/JP2018/024218
§ 371 (c)(1),
(2) Date: Feb. 27, 2020

(87) PCT Pub. No.: WO2019/044140
PCT Pub. Date: Mar. 7, 2019

(65) Prior Publication Data
US 2020/0189854 A1 Jun. 18, 2020

(30) Foreign Application Priority Data
Aug. 31, 2017 (JP) ................................. 2017-166648

(51) Int. Cl.
*B65G 43/02* (2006.01)
*B65G 15/08* (2006.01)
*B65G 15/40* (2006.01)

(52) U.S. Cl.
CPC .............. *B65G 43/02* (2013.01); *B65G 15/08* (2013.01); *B65G 15/40* (2013.01);
(Continued)

(58) Field of Classification Search
CPC ...................................................... B65G 43/02
See application file for complete search history.

(56) References Cited

U.S. PATENT DOCUMENTS 7,427,767 B2 * 9/2008 Kemp .................... B65G 43/02
198/502.1
10,294,038 B2 5/2019 Hou
(Continued)

FOREIGN PATENT DOCUMENTS

DE 10 2014 112 886 A1 3/2016
DE 11 2017 006 852 T5 9/2019
(Continued)

*Primary Examiner* — Thomas Randazzo
(74) *Attorney, Agent, or Firm* — Carrier Blackman & Associates, P.C.; Joseph P. Carrier; Anne G. Sabourin

(57) ABSTRACT

Surface image data relating to an upper cover rubber is continuously and successively captured by a surface camera device and input to a computation device. Each piece of surface image data is stored in a database in association with data on the circumferential position of that surface image data on a conveyor belt and data on the time at which that surface image data was captured. An input unit is used to display any piece of surface image data on a monitor, register surface image data in which a predetermined defect is present on the surface of the upper cover rubber in the database as data to be monitored, and automatically register in the database surface image data having the same circumferential position data as the data to be monitored as related data to be monitored. Such monitoring system determines the state of damage of a cover rubber surface.

6 Claims, 11 Drawing Sheets

(52) U.S. Cl.
CPC ........... *B65G 2203/0208* (2013.01); *B65G 2203/0275* (2013.01); *B65G 2203/0283* (2013.01); *B65G 2203/041* (2013.01); *B65G 2203/044* (2013.01); *B65G 2207/48* (2013.01)

(56) References Cited

U.S. PATENT DOCUMENTS

| | | | |
|---|---|---|---|
| 2003/0168317 A1* | 9/2003 | Fromme | G01N 21/8915 198/502.1 |
| 2006/0114452 A1 | 6/2006 | Schnell | |
| 2012/0125736 A1* | 5/2012 | Twigger | B65G 43/06 198/502.1 |
| 2013/0058560 A1* | 3/2013 | Sobczak | G06T 7/0004 382/152 |
| 2014/0336812 A1 | 11/2014 | Rathmann et al. | |
| 2016/0200520 A1* | 7/2016 | Menke | B65G 17/08 198/502.1 |
| 2017/0267460 A1 | 9/2017 | Buchwald et al. | |
| 2019/0035209 A1 | 1/2019 | Simons et al. | |
| 2020/0156878 A1 | 5/2020 | Hou | |

FOREIGN PATENT DOCUMENTS

| | | |
|---|---|---|
| DE | 11 2017 007 443 T5 | 1/2020 |
| JP | S59-92817 A | 5/1984 |
| JP | 2008-203168 A | 9/2008 |
| JP | 2010-052927 A | 3/2010 |
| JP | 2011-058893 A | 3/2011 |
| JP | 2015-202933 A | 11/2015 |
| JP | 2016-196351 A | 11/2016 |
| JP | 2017-043425 A | 3/2017 |

\* cited by examiner

MONITORING SYSTEM FOR CONVEYOR BELT

TECHNICAL FIELD

The present invention relates to a monitoring system for a conveyor belt and particularly relates to a monitoring system for a conveyor belt that can quickly and easily determine the state of damage of a conveyor belt cover rubber surface and prevent conveyor belt breakage caused by surface damage.

BACKGROUND ART

Various objects, including mineral resources such as iron ore and limestone, are conveyed by a conveyor belt. These conveyed objects are fed onto the surface of a cover rubber around the conveyor belt from a hopper or another conveyor belt. The surface of the cover rubber becomes worn and damaged over time due to the fed conveyed objects. The amount of wear and damage on the cover rubber may increase to the extent that the conveyor belt breaks and can no longer travel. When this happens, a large amount of time and effort is required to fix the conveyor belt line. While the amount of wear gradually increases over time, damage may spontaneously occur and quickly worsen. Thus, it is desirable to monitor the state of damage of the surface of the cover rubber to determine the presence of any damage that may cause the conveyor belt to break, and the progression of that damage.

In the related art, various known methods are designed to monitor conveyor belts (see, for example, Patent Documents 1 and 2). The method proposed in Patent Document 1 involves using a magnetic sensor to detect magnetic force generated by a magnet embedded in a conveyor belt and determine the amount of wear of the conveyor belt on the basis of a detected change in magnetic force. In the method proposed in Patent Document 2, signs of conveyor belt breakage and other factors are detected on the basis of stretch of the conveyor belt and tension applied to the carcass when the conveyor belt travels.

However, these conventional monitoring methods cannot be used to determine the state of damage of the surface of the cover rubber. Thus, it is difficult to prevent conveyor belt breakage caused by damage to the cover rubber.

CITATION LIST

Patent Literature

Patent Document 1: JP 2010-52927 A
Patent Document 2: JP 2017-43425 A

SUMMARY OF INVENTION

Technical Problem

An object of the present invention is to provide a monitoring system that can quickly and easily determine the state of damage of a conveyor belt cover rubber surface and prevent conveyor belt breakage caused by surface damage.

Solution to Problem

A monitoring system for a conveyor belt according to an embodiment of the present invention that solves the above-described object includes a surface camera device that is installed at a predetermined position on a conveyor line and can continuously and successively capture surface image data relating to a conveyor belt rubber cover while the conveyor belt travels; a computation device that receives input of the surface image data; a monitor communicably connected to the computation device; and an input unit that inputs an instruction to the computation device which stores in a database each piece of surface image data of the computation device in association with data on a circumferential position of that piece of surface image data on the conveyor belt and data on the time at which that piece of surface image data is captured. The monitor can display any piece of surface image data from the database in response to an instruction from the input unit, surface image data among the displayed surface image data in which a predetermined defect is present on the surface of the rubber cover is registered in the database as data to be monitored in response to an instruction from the input unit, and surface image data having the same circumferential position data as the data to be monitored is automatically registered in the database as related data to be monitored.

Advantageous Effects of Invention

According to the present invention, it is possible to prevent conveyor belt breakage caused by damage to the surface of the cover rubber as a result of being able to determine the progression (change over time) of a prescribed defect by displaying, on a monitor, surface image data registered in a database as data to be monitored and related data to be monitored.

In order to determine the progression of the prescribed defect, it is required that surface image data relating to the cover rubber be continuously captured using the surface camera device, and surface image data in which the predetermined defect is present on the surface of the cover rubber be registered in the database using the input unit. Thus, the time required to determine the state of damage of the surface of the cover rubber across the entire circumference of the conveyor belt is decreased compared to the prior art and monitoring work is simplified.

DESCRIPTION OF EMBODIMENTS

A monitoring system for a conveyor belt according to embodiments of the present invention will be described below with reference to the drawings.

Figure 1:
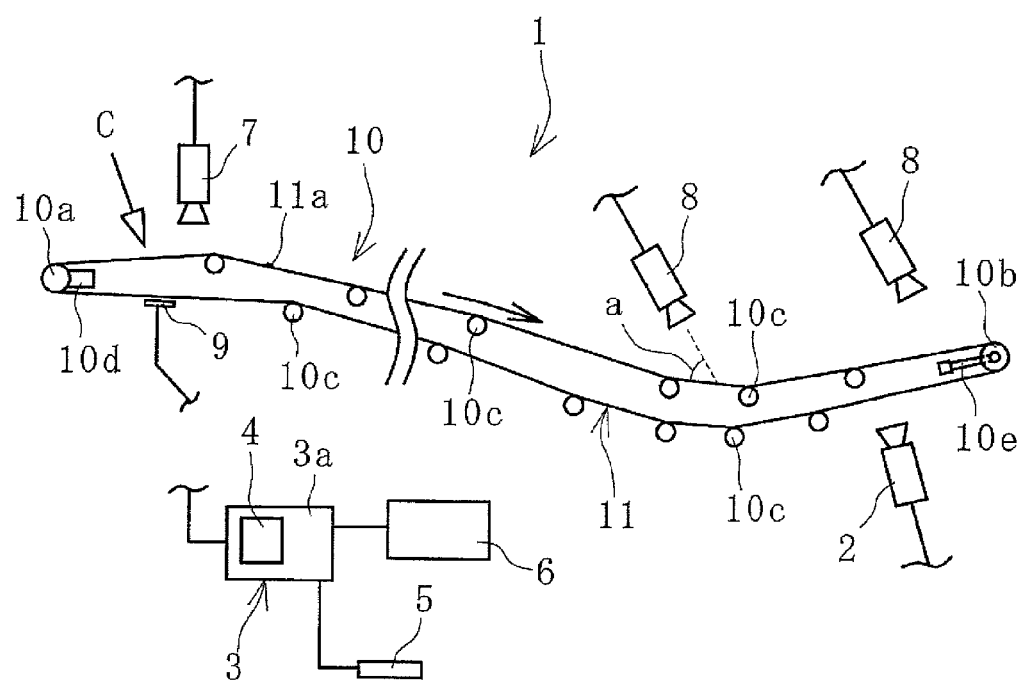
FIG. 1 is an explanatory diagram illustrating a conveyor line when viewed from the side to which a monitoring system for a conveyor belt according to an embodiment of the present invention is applied.
Figure 2:
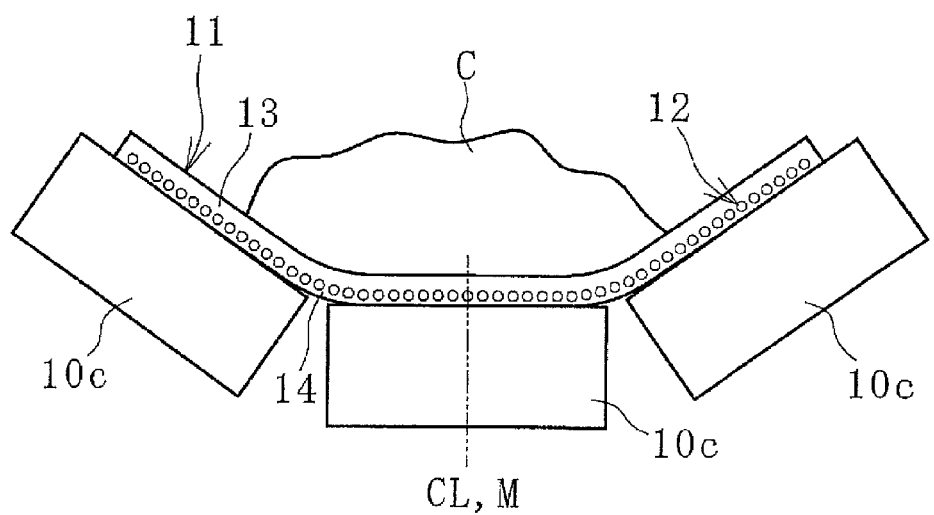
FIG. 2 is an explanatory diagram illustrating a widthwise cross-section on a carrier side of the conveyor belt of FIG. 1.

A monitoring system 1 (referred to below as "system 1") for a conveyor belt according to an embodiment of the present invention illustrated in FIG. 1 monitors a conveyor belt 11 mounted to a conveyor line 10. As illustrated in FIG. 2, the monitored conveyor belt 11 includes a carcass 12 formed of canvas or steel cords, and an upper cover rubber 13 and a lower cover rubber 14 that sandwich the carcass 12. The carcass 12 bears tension when the conveyor belt 11 is stretched and mounted. The conveyor belt 11 may include additional necessary members as appropriate. In FIG. 2, the lateral center line of the conveyor belt 11 is indicated as a dot-dash line CL, and the lateral center line of the conveyor line 10 is indicated as a dot-dash line M. In FIG. 2, the dot-dash lines CL and M are located at the same position.

The conveyor belt 11 is stretched and mounted at a predetermined tension on a drive pulley 10a and a driven pulley 10b. The conveyor belt 11 is supported between the drive pulley 10a and the driven pulley 10b by support rollers 10c. The support rollers 10c are disposed at appropriate intervals in the belt longitudinal direction.

On a carrier side of the conveyor belt 11, the lower cover rubber 14 is supported by the support rollers 10c disposed at predetermined positions spaced apart in the longitudinal direction of the conveyor belt 11. On the carrier side, three support rollers 10c are disposed in a row in the belt lateral direction at different predetermined positions and support the conveyor belt 11 in a recessed manner at a predetermined trough angle. On a return side of the conveyor belt 11, the upper cover rubber 13 is supported by the support rollers 10c disposed at predetermined positions spaced apart in the longitudinal direction of the conveyor belt 11.

The drive pulley 10a is rotationally driven by a drive motor 10d. The conveyor belt 11 travels in one longitudinal direction using rotation of the drive pulley 10a. A take-up mechanism 10e moves the driven pulley 10b to change the distance between the drive pulley 10a and the driven pulley 10b such that tension acts on the conveyor belt 11 (carcass 12).

The system 1 includes a surface camera device 2 installed at a predetermined position of the conveyor line 10, a computation device 3, an input unit 5 for inputting instructions to the computation device 3, and a monitor 6 communicatively connected to the computation device 3. The system 1 according to this embodiment also includes a conveyed object camera device 7, mistracking camera devices 8, and an amount of wear detection device 9. As a specific example, a digital video camera or similar device can be used as the surface camera device 2, the conveyed object camera device 7 and the mistracking camera devices 8.

Figure 3:
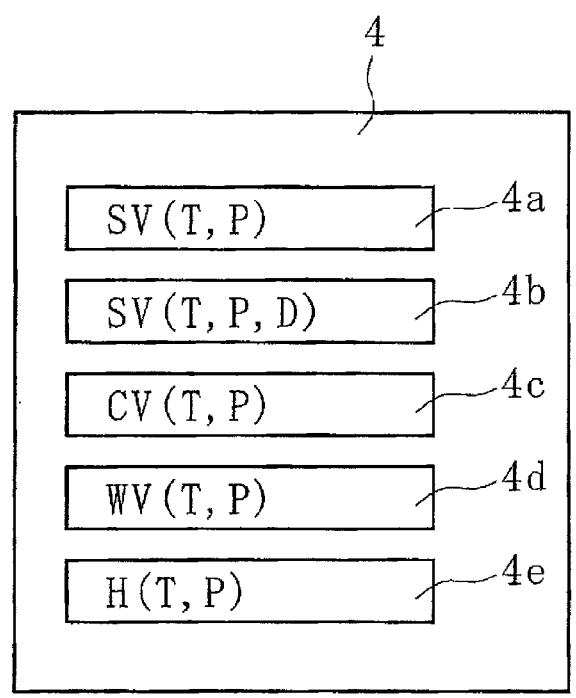
FIG. 3 is an explanatory diagram illustrating the configuration of a database.

A computer or similar device is used as the calculation device 3. A database 4 is built into the computing device 3 and various data are stored in the database 4. Data relating to the circumferential length of the conveyor belt 11 is input and stored in the calculation device 3. Data on the traveling speed of the conveyor belt 11 is also sequentially input and stored in the calculation device 3. As illustrated in FIG. 3, in this embodiment, the database 4 includes a plurality of databases 4a to 4e. Any data stored in the database 4 (such as image data described below) can be displayed on the monitor 6 in response to an instruction input by the input unit 5.

A control unit 3a is attached to the computation device 3. The control unit 3a controls the operation of the surface camera device 2, the conveyed object camera device 7, the mistracking camera devices 8, and the amount of wear detection device 9.

Figure 4:
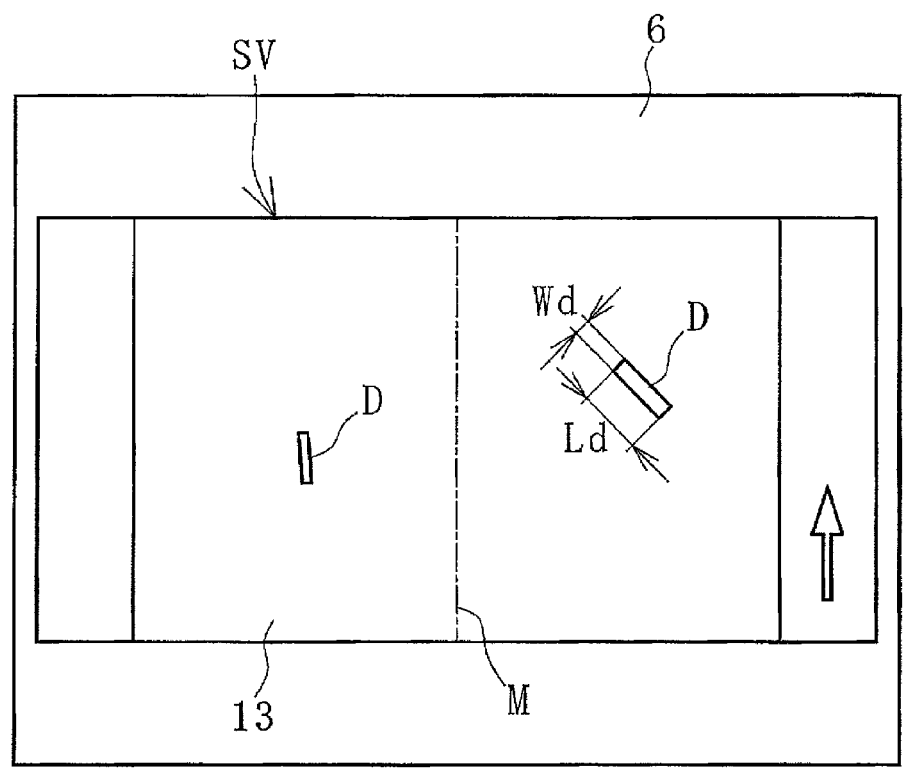
FIG. 4 is an explanatory diagram illustrating surface image data displayed on a monitor.

As illustrated in FIG. 4, the surface camera device 2 is configured to continuously and sequentially capture surface image data SV (image data obtained by capturing the surface of the upper cover rubber 13 in plan view) relating to the upper cover rubber 13 of the conveyor belt 11 when the conveyor belt 11 travels. The arrow at the bottom right of FIG. 4 indicates the travel direction of the conveyor belt 11. The surface camera device 2 is fixed at a predetermined position of the conveyor line 10 on the return side of the conveyor belt 11 in order to capture the surface image data SV relating to the upper cover rubber 13 in a state where no conveyed objects C are on the conveyor belt 11. The imaging direction of the surface camera device 2 needs to be set to a direction orthogonal to the upper cover rubber 13)(90°). It is necessary to install one surface camera device 2 for one conveyor line 10, but a plurality of the surface camera devices 2 may be installed.

Figure 5:
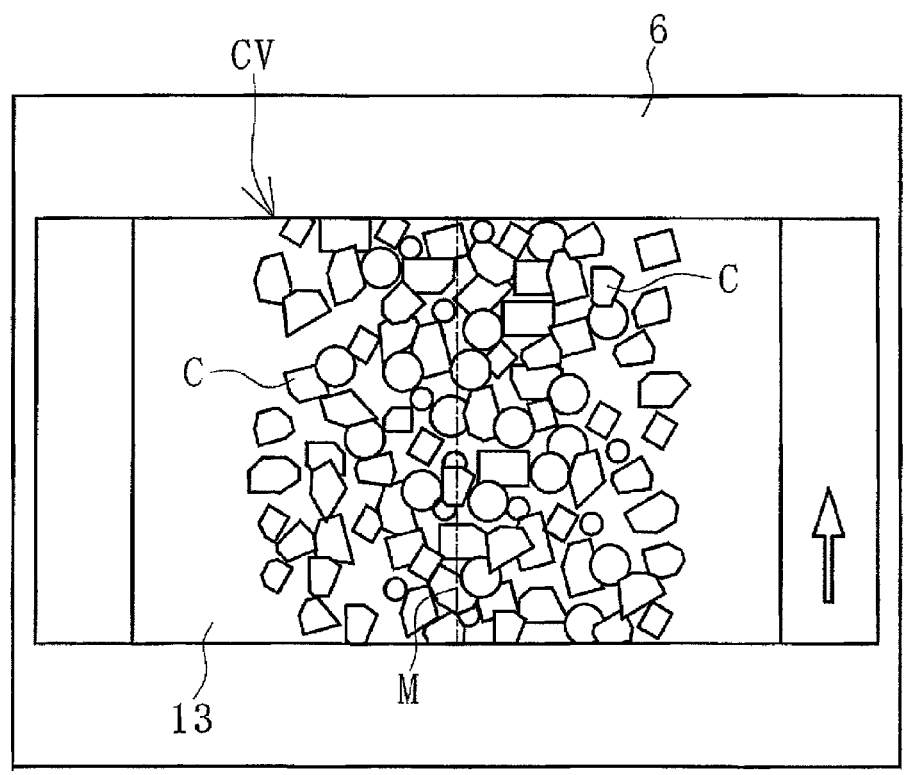
FIG. 5 is an explanatory diagram illustrating conveyed object image data displayed on a monitor.

As illustrated in FIG. 5, the conveyed object camera device 7 is configured to sequentially capture conveyed object image data CV (image data obtained by capturing the conveyed objects C in plan view) relating to the conveyed objects C that are fed onto the upper cover rubber 13. The arrow at the bottom right of FIG. 5 indicates the travel direction of the conveyor belt 11. The conveyed object camera device 7 is fixed at a predetermined position of the conveyor line 10 on the carrier side of the conveyor belt 11 in order to capture the conveyed object image data CV relating to the conveyed objects C that are fed and loaded onto the upper cover rubber 13. The imaging direction of the conveyed object camera device 7 needs to be set to a direction orthogonal to the upper cover rubber 13)(90°). It is necessary to install one conveyed object camera device 7 for one conveyor line 10, but a plurality of the conveyed object camera devices 7 may be installed.

Figure 6:
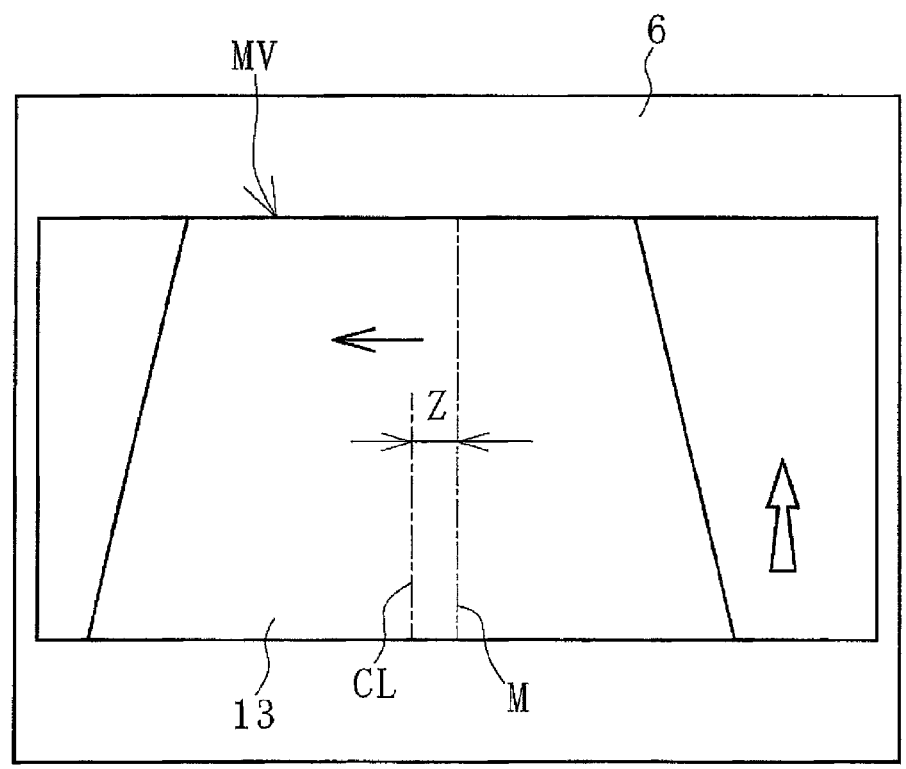
FIG. 6 is an explanatory diagram illustrating mistracking determination image data displayed on a monitor.

As illustrated in FIG. 6, the mistracking camera device 8 is configured to continuously and sequentially capture mistracking determination image data WV obtained by imaging, in plan view, a predetermined longitudinal range of the conveyor belt 11 while the conveyor belt 11 travels. The arrow at the bottom right of FIG. 6 indicates the travel direction of the conveyor belt 11. The mistracking camera devices 8 are fixed to the conveyor line 10 at circumferential positions where a mistracking amount Z of the conveyor belt 11 along the conveyor line 10 is excessive. Accordingly, one mistracking camera device 8 or a plurality of the mistracking camera devices 8 may be installed for one conveyor line 10.

The mistracking amount Z is the degree of misalignment of the conveyor belt 11 in the lateral direction of the conveyor belt 11. In FIG. 6, the mistracking amount Z is illustrated as the degree of misalignment of the conveyor belt 11 at a lateral center CL of the conveyor belt 11 with respect to a lateral center line M of the conveyor line 10.

When an angle a formed between the imaging direction of the mistracking camera device 8 and the upper cover rubber 13 is reduced, the predetermined longitudinal range in which data can be captured increases and captured mistracking determination image data WV becomes tapered image data.

Thus, the angle a is set to from 30° to 90°, and more preferably is set to from 45° to 90°.

The amount of wear detection device 9 detects an amount of wear H on the upper cover rubber 13. In order to detect the amount of wear H on the upper cover rubber 13 in a state where conveyed objects C are not on the conveyor belt 11, the amount of wear detection device 9 is fixed at a predetermined position of the conveyor line 10 on the return side of the conveyor belt 11. As the amount of wear detection device 9, a laser sensor or similar device including an irradiation unit that irradiates the upper cover rubber 13 with a laser beam and a light receiver that receives the laser beam reflected on the upper cover rubber 13 can be used.

It is necessary that the input unit 5 be a device capable of inputting an instruction signal to the computation device 3 and the control unit 3a, and for example, a keyboard, a mouse, or the like can be used. The input unit 5 and the computation device 3 are in wired or wireless communication with each other. The monitor 6 is also in wired or wireless communication with the computation device 3.

The conveyor belt 11 is provided with an origin point 11a for identifying where a desired portion of the conveyor belt 11 is located along the circumferential direction of the conveyor belt 10 at any given time. Various objects may be used for the origin point 11a. For example, indicia (such as colored rubber acting as a marker) attached to the surface of the upper cover rubber 13 may be used.

In a configuration employing colored rubber as the origin point 11a, when surface image data SV including the origin point 11a is captured by the surface camera device 2, the time (time data T) at which the surface image data SV is captured is known. Because the traveling speed and the circumferential length of the conveyor belt 11 are also known, the circumferential separation length from the origin point 11a, which is provided at a portion of the conveyor belt 11 that passes the installation location of the surface camera device 2, is calculated and determined by the computation device 3 for any point in time. Thus, the circumferential position (data P on circumferential position) of the surface image data SV on the conveyor belt 11 is calculated and determined by the computation device 3 on the basis of the data T relating to the time at which the surface image data SV is captured.

The interval between the conveyed object camera device 7 and the surface camera device 2 in the circumferential direction of the conveyor line 10 is known. Thus, the circumferential position (data P on circumferential position) of the conveyed object image data CV on the conveyor belt 11 is calculated and determined by the computation device 3 on the basis of the time (time data T) at which the conveyed object image data CV is captured.

The interval between the mistracking camera device 8 and the surface camera device 2 in the circumferential direction of the conveyor line 10 is known. Thus, the circumferential position (data P on circumferential position) of the mistracking determination image data WV on the conveyor belt 11 is calculated and determined by the computation device 3 on the basis of the time (time data T) at which the mistracking determination image data WV is captured.

The interval between the amount of wear detection device 9 and the surface camera device 2 in the circumferential direction of the conveyor line 10 is known. Thus, the circumferential position (data P on circumferential position) on the conveyor belt 11 at which the amount of wear H has occurred is calculated and determined by the computation device 3 on the basis of the time (time data T) at which the amount of wear H is detected by the amount of wear detection device 9.

With this configuration, each piece of surface image data SV is stored in the database 4a in association with the data P on the circumferential position of that piece of surface image data SV on the conveyor belt 11 and the data T on the time at which that piece of surface image data SV was captured.

Each piece of conveyed object image data CV is stored in the database 4c in association with the data T on the time at which that piece of conveyed object image data CV was captured. In this embodiment, each piece of the conveyed object image data CV is also stored in the database 4c in association with the data P on the circumferential position of that piece of conveyed object image data CV on the conveyor belt 11.

Each piece of mistracking determination image data WV is stored in the database 4d in association with the data T on the time at which that piece of mistracking determination image data WV was captured. In this embodiment, each piece of the mistracking determination image data WV is also stored in the database 4c in association with the data P on the circumferential position of that piece of mistracking determination image data WV on the conveyor belt 11.

Each amount of wear H is stored in the database 4e in association with the data T on the time at which that amount of wear H was captured. In this embodiment, each amount of wear H is also stored in the database 4e in association with the data P on the circumferential position of that amount of wear H on the conveyor belt 11.

Next, a method for monitoring the conveyor belt 11 using the system 1 will be described.

In the conveyor line 10, the conveyed object C is fed onto the upper cover rubber 13 using, for example, a hopper or the like while the conveyor belt 11 is running. The surface camera device 2, the conveyed object camera device 7 and the mistracking camera devices 8 sequentially capture the surface image data SV, the conveyed object image data CV and the mistracking determination image data WV, respectively. These image data are input and stored in the computation device 3 as described above.

The image data SV, CV and WV may be continuously captured by constantly operating the surface camera device 2, the conveyed object camera device 7 and the mistracking determination camera devices 8, or the image data SV, CV and WV may be continuously captured for a set period of time (a prescribed period of time such as daily or weekly) in which the surface camera device 2, the conveyed object camera device 7 and the mistracking determination camera devices 8 are operated. The above configuration may only be adopted provided that the image data SV, CV and WV are continuously captured for at least one conveyor belt 1 revolution around the conveyor line 10 (one cycle).

Similarly, the amount of wear H may be continuously detected by constantly operating the amount of wear detection device 9, or the amount of wear H may be continuously detected for a preset period of time (a predetermined period of time such as daily or weekly) in which the amount of wear detection device 9 is operated. The above configuration may only be adopted provided that the amount of wear H is continuously captured for at least one conveyor belt 1 revolution around the conveyor line 10 (one cycle).

A monitoring party displays, on the monitor 6, the surface image data SV from the database 4a equivalent to one cycle in the preset time data T at appropriate monitoring intervals (for example, daily or weekly) to check whether a predetermined defect D (a defect D having a preset size or greater) is present on the surface of the upper cover rubber 13. If surface image data SV including the predetermined defect D is found, that surface image data SV is registered in the database 4*b* as data to be monitored in response to an instruction from the input unit 5. In other words, the database 4*b* stores the surface image data SV including the predetermined defect D along with the circumferential position data P and the data T on the time at which the surface image data SV is captured.

In this embodiment, the size of the predetermined defect D (defect length Ld and defect width Wd) in the surface image data SV displayed on the monitor 6 is identified, and the identified size is input to the computation device 3 in response to an instruction from the input unit 5. The identified size input to the computation device 3 is registered and stored in the database 4*b* in association with the surface image data including the predetermined defect D. The size of the predetermined defect D may be identified by the monitoring party measuring the size on the surface image data SV or automatically identified using software input to the computation device 3.

Any surface image data SV having the same circumferential position data P as the surface image data SV registered as data to be monitored is automatically registered in the database 4*b* as related data to be monitored by the computation device 3. Thus, the surface image data SV registered as data to be monitored and related data to be monitored and stored in the database 4*b* in association with the time data T and the circumferential position data P. Thereafter, surface image data SV including the predetermined defect D accumulates in the database 4*b*.

By specifying the circumferential position data P using an instruction from the input unit 5, surface image data SV in the specified circumferential position data P can be called up from the database 4*b* and displayed on the monitor 6. With this configuration, it is possible to determine the progression (change over time) of the predetermined defect D in the specified circumferential position data P. As a result, the conveyor belt 11 can be prevented from breaking due to damage to the surface of the upper cover rubber 13. By specifying the time data T using an instruction from the input unit 5, surface image data SV in the specified time data T (time range) can be extracted.

In the present invention, it is necessary to continuously capture the surface image data SV using the surface camera device 2 as described above to determine the progression of the predetermined defect D. In addition, it is necessary to register the surface image data SV in which the predetermined defect D is present on the surface of the cover rubber 13 in the database 4*b* as data to be monitored using the input unit 5. Accordingly, it is not necessary to successively visually inspect the entire cover rubber 13 in order to determine the stage of damage of the surface of the cover rubber 13 across the entire the conveyor belt 11, and monitoring can be performed even when the conveyor line 10 is operating.

Figure 7:
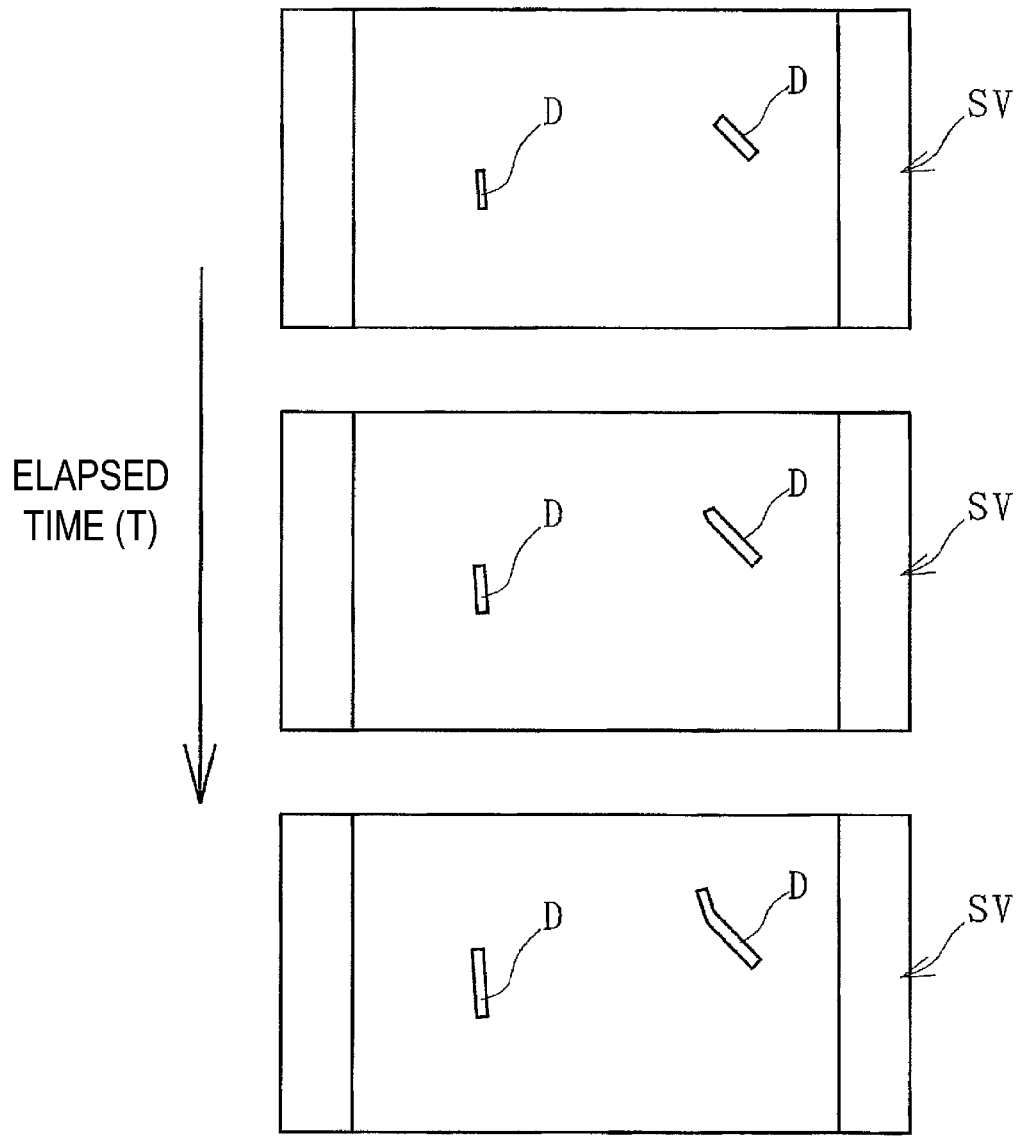
FIG. 7 is an explanatory diagram illustrating a state in which surface image data registered as data to be monitored and related data to be monitored is displayed on a monitor in a time series.

The surface image data SV registered in the database 4*b* as data to be monitored and related data to be monitored can also be displayed on the monitor 6 in a time series as illustrated in FIG. 7 using an instruction from the input unit 5. The monitor 6 can be viewed to clearly determine the progression of the prescribed defect D. In FIG. 7, the surface image data SV is displayed in a time series from top to bottom, but the surface image data SV may be displayed in a time series from bottom to top or in a left-right direction.

Figure 8:
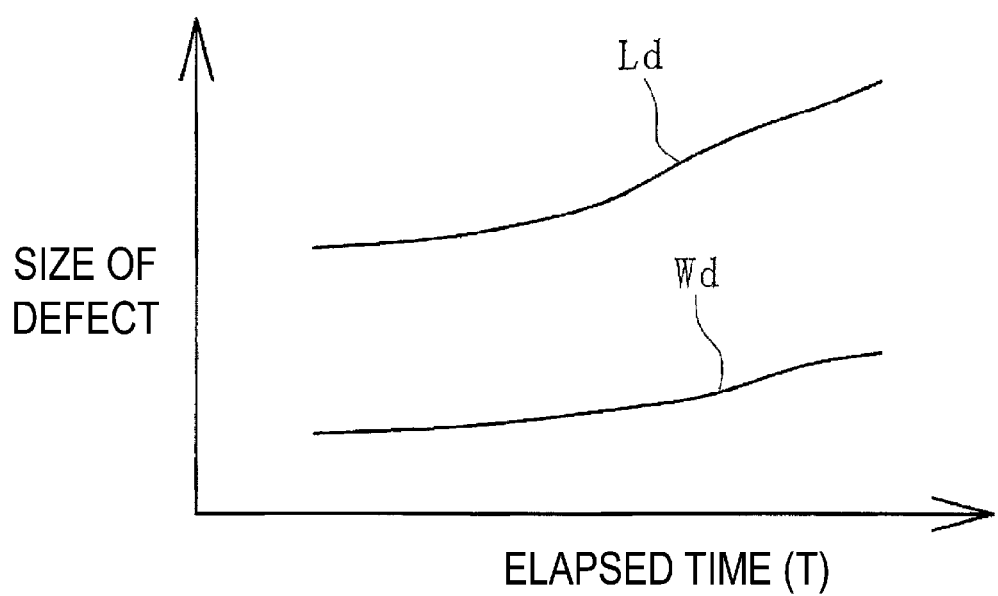
FIG. 8 is a graph showing a change in size over time of a predetermined defect on a cover rubber surface.

In this embodiment, the identified size of the predetermined defect D is stored in the database 4*b* in association with the surface image data SV. Thus, by specifying the circumferential position data P using an instruction from the input unit 5, the change over time of the identified size of the predetermined defect D in the specified circumferential position data P can also be displayed on the monitor 6 as illustrated in FIG. 8. In FIG. 8, the change over time of the defect length Ld and the defect width Wd are displayed as the size of the predetermined defect D. The monitor 6 can be viewed to quantitatively determine the progression of the predetermined defect D. By setting a permissible range for the size of the predetermined defect D and inputting this range to the computation device 3 in advance, a warning (warning text or display) can be issued when the size of the predetermined defect D exceeds the permissible range.

Each piece of conveyed object image data CV is stored in the database 4*c* in association with the data T on the time at which that piece of conveyed object image data CV was captured. Thus, by specifying the time data T using an instruction from the input unit 5, the conveyed object image data CV in the specified time data T can also be called up from the database 4*c* and displayed on the monitor 6. By further specifying the circumferential position data P using an instruction from the input unit 5, the conveyed object image data CV in the specified circumferential position data P can be called up from the database 4*c* and displayed on the monitor 6. Thus, the monitor 6 can be viewed to determine what kind of conveyed object C (material, size, and shape) was fed onto the upper cover rubber 13 in data T at a desired time.

Each piece of mistracking determination image data WV is stored in the database 4*d* in association with the data T on the time at which that piece of mistracking determination image data WV was captured. Thus, by specifying the time data T using an instruction from the input unit 5, the mistracking determination image data WV in the specified time data T can also be called up from the database 4*d* and displayed on the monitor 6. By further specifying the circumferential position data P using an instruction from the input unit 5, the mistracking determination image data WV in the specified circumferential position data P can be called up from the database 4*d* and displayed on the monitor 6. Thus, the monitor 6 can be viewed to determine the magnitude of the mistracking amount Z in data T at a desired time.

Figure 9:
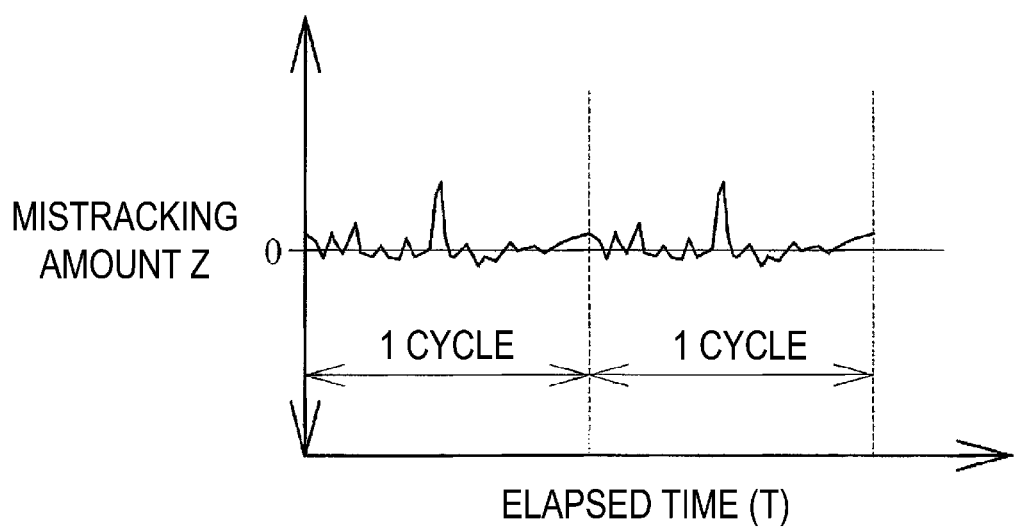
FIG. 9 is a graph showing a change in amount of mistracking over time.

In this embodiment, the mistracking amount Z is determined by the monitoring party measuring the mistracking amount Z on the mistracking determination image data WV or automatically calculated using software input to the computation device 3. The mistracking amount Z is stored in the database 4*d* in association with the mistracking determination image data WV. Thus, the change over time of the mistracking amount Z in specified time data T can be displayed on the monitor 6 as illustrated in FIG. 9 using an instruction from the input unit 5. The monitor 6 can be viewed to quantitatively determine the degree of change of the mistracking amount Z. By setting a permissible range for the mistracking amount Z and inputting this range to the computation device 3 in advance, a warning (warning text or display) can be issued when the mistracking amount Z exceeds the permissible range.

Each detected amount of wear H is stored in the database 4*e* in association with the data T on the time at which that amount of wear H was detected. Thus, by specifying the time data T using an instruction from the input unit 5, the amount of wear H in the specified time data T can also be called up from the database 4e and displayed on the monitor 6. By further specifying the circumferential position data P using an instruction from the input unit 5, the amount of wear H in the specified circumferential position data P can be called up from the database 4e and displayed on the monitor 6. Thus, the monitor 6 can be viewed to determine the amount of wear H in data T at a desired time.

Figure 10:
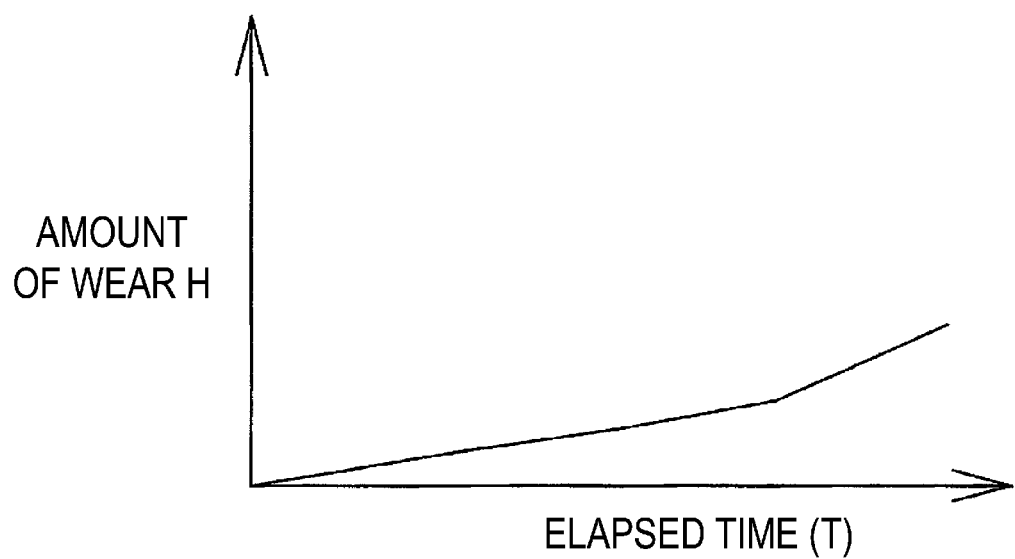
FIG. 10 is a graph showing a change in amount of wear over time.

In this embodiment, the change over time of the amount of wear H at a specified circumferential position P can also be displayed on the monitor 6 as illustrated in FIG. 10 using an instruction from the input unit 5. The monitor 6 can be viewed to quantitatively determine the degree of change in the amount of wear H. By setting a permissible range for the amount of wear H and inputting this range to the computation device 3, a warning (warning text or display) can be issued when the amount of wear H exceeds the permissible range.

Figure 11:
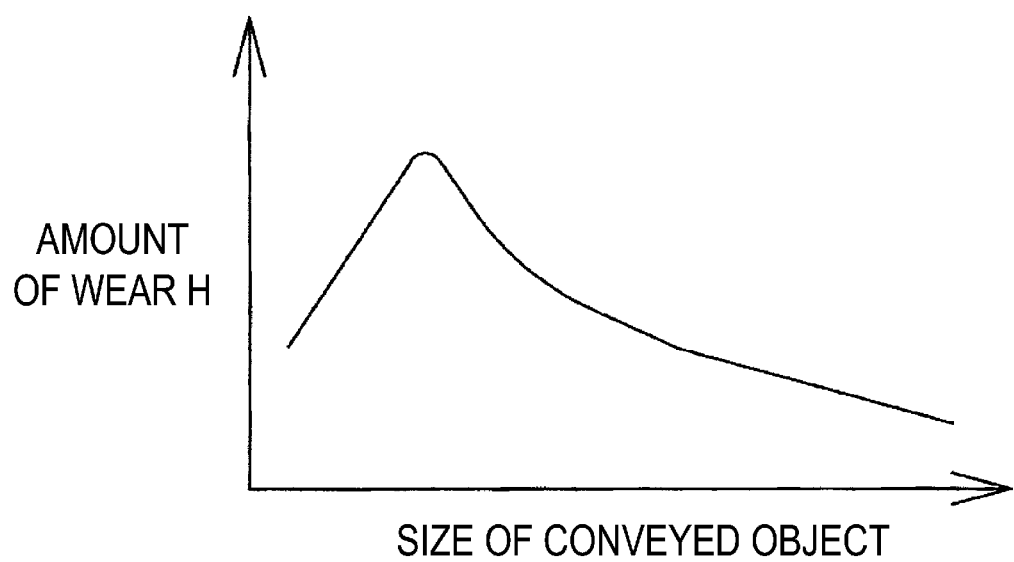
FIG. 11 is a graph showing a relationship between a size of a conveyed object and amount of wear.

The size of the conveyed object C and the amount of wear H are understood to have the correlation shown in FIG. 11. In this embodiment, a conveyed object C at a desired time data T can be determined using the conveyed object image data CV. Accordingly, it is advantageous to predict how the amount of wear H illustrated in FIG. 10 will change in the future (whether the wear rate will increase or decrease), taking into consideration the sizes of the conveyed objects C fed onto the upper cover rubber 13.

In this embodiment, the surface image data SV, the conveyed object image data CV, the mistracking determination image data WV (mistracking amount Z) and the amount of wear H can be determined at any specified time data T and circumferential position data P. Thus, it is beneficial to analyze and determine the influence of these data on the predetermined defect D, the specifications (material, size, and shape) of the conveyed objects C, the mistracking amount Z, and the amount of wear H.

All of the data stored in the computation device 3 (database 4) can be transmitted to a computation device 3 installed at another location using, for example, an Internet network. Thus, the conveyor belt 11 can be monitored at any location (such as a remote location away from the conveyor line 10).

In the embodiment described above, the state of the upper cover rubber 13 is determined, but the state of the lower cover rubber 14 may also be determined using the same method if necessary.

REFERENCE SIGNS LIST

1 Monitoring system
2 Surface camera device
3 Computation device
3a Control unit
4 (4a, 4b, 4c, 4d, 4e) Database
5 Input unit
6 Monitor
7 Conveyed object camera device
8 Mistracking camera device
9 Amount of wear detection device
10 Conveyor line
10a Drive pulley
10b Driven pulley
10c Support roller
10d Drive motor
10e Take-up mechanism
11 Conveyor belt
11a Origin point
12 Carcass
13 Upper cover rubber
14 Lower cover rubber
D Predetermined defect
P Circumferential position data
T Time data
H Amount of wear
Z Mistracking amount
SV Surface image data
CV Conveyed object image data
WV Mistracking determination image data

The invention claimed is:

1. A monitoring system for a conveyor belt comprising:
a surface camera device that is installed at a predetermined position of a conveyor line and can continuously and successively capture surface image data relating to a conveyor belt rubber cover while the conveyor belt travels;
a computation device that receives input of the surface image data;
a monitor communicably connected to the computation device;
an input unit that inputs an instruction to the computation device, and
a mistracking camera device,
each piece of surface image data being stored in a database of the computation device in association with data on a circumferential position of that piece of surface image data on the conveyor belt and data on the time at which that piece of surface image data is captured;
the monitor being able to display any piece of surface image data from the database in response to an instruction from the input unit;
surface image data among the displayed surface image data in which a predetermined defect is present on the surface of the rubber cover being registered in the database as data to be monitored in response to an instruction from the input unit;
surface image data having the same circumferential position data as the data to be monitored being automatically registered in the database as related data to be monitored; and
the mistracking camera device continuously and successively capturing mistracking determination image data obtained by capturing, in plan view, a longitudinal predetermined range of the conveyor belt while the conveyor belt travels, wherein:
each piece of mistracking determination image data is stored in the database in association with data on the time at which that piece of mistracking determination image data is captured;
any piece of mistracking determination image data from the database can be displayed on the monitor in response to an instruction from the input unit; and
a mistracking amount of the conveyor belt on the mistracking determination image data displayed on the monitor is calculated by the computation device and registered in the database in association with the mistracking determination image data for which the mistracking amount has been calculated.

2. The monitoring system for a conveyor belt according to claim 1, wherein the surface image data registered as the data to be monitored and the related data to be monitored is displayed on the monitor in a time series in response to an instruction from the input unit.

3. The monitoring system for a conveyor belt according to claim 1, further comprising a conveyed object camera device that can successively capture conveyed object image data relating to conveyed objects that are fed onto the rubber cover,
   wherein each piece of conveyed object image data is stored in the database in association with data on the time at which that piece of conveyed object image data is captured.

4. The monitoring system for a conveyor belt according to claim 1, further comprising an amount of wear detection device that can continuously and successively detect an amount of wear on the rubber cover,
   wherein each amount of wear is stored in the database in association with data on time at which that amount of wear is detected.

5. The monitoring system for a conveyor belt according to claim 1, wherein the size of the predetermined defect on the surface image data displayed on the monitor is identified, and the identified size is input to the computation device in response to an instruction from the input unit and registered in the database in association with surface image data in which a predetermined defect having the identified size is present.

6. The monitoring system for a conveyor belt according to claim 5, wherein the change over time of the identified size of the predetermined defect is displayed on the monitor in response to an instruction from the input unit.

* * * * *